US 9,050,919 B2

(12) United States Patent  
Matsumoto et al.

(10) Patent No.: US 9,050,919 B2  
(45) Date of Patent: Jun. 9, 2015

(54) VEHICLE SEAT CUSHION (75) Inventors: Tomoki Matsumoto, Utsunomiya (JP); Yoshitomo Oka, Utsunomiya (JP)

(73) Assignee: HONDA MOTOR CO., LTD., Tokyo (JP)

(*) Notice: Subject to any disclaimer, the term of this patent is extended or adjusted under 35 U.S.C. 154(b) by 47 days.

(21) Appl. No.: 13/996,279

(22) PCT Filed: Dec. 16, 2011

(86) PCT No.: PCT/JP2011/079194  
§ 371 (c)(1),  
(2), (4) Date: Jun. 20, 2013

(87) PCT Pub. No.: WO2012/086546  
PCT Pub. Date: Jun. 28, 2012

(65) Prior Publication Data  
US 2013/0278041 A1    Oct. 24, 2013

(30) Foreign Application Priority Data  
Dec. 24, 2010 (JP) ................. 2010-287716

(51) Int. Cl.  
*A47C 7/02* (2006.01)  
*B60N 2/70* (2006.01)  
*A47C 7/30* (2006.01)

(52) U.S. Cl.  
CPC ... *B60N 2/70* (2013.01); *A47C 7/30* (2013.01); *B60N 2/7094* (2013.01)

(58) Field of Classification Search  
CPC .......... B60N 2/70; B60N 2/7094; A47C 7/24; A47C 7/28; A47C 7/30  
USPC .............. 297/452.52, 452.49, 452.53–452.54  
See application file for complete search history.

(56) References Cited

U.S. PATENT DOCUMENTS 3,675,970 A * 7/1972 Bereday .................. 297/452.55  
4,458,943 A * 7/1984 Krakauer ................ 297/452.52  
(Continued)

FOREIGN PATENT DOCUMENTS

JP    S58-191852 U    12/1983  
JP    62-2649          1/1987  
(Continued)

OTHER PUBLICATIONS

Japanese Office Action with English translation dated Mar. 11, 2014, 4 pages.

*Primary Examiner* — Daniel J Troy  
*Assistant Examiner* — Ryan A Doyle  
(74) *Attorney, Agent, or Firm* — Rankin, Hill & Clark LLP (57) ABSTRACT A vehicle seat cushion is provided with: a cushion body that makes contact with the body of a vehicle occupant; and a plurality of spring bodies that are suspended on a seat frame so as to extend in the fore-and-aft direction of the seat. The plurality of spring bodies include inner region spring bodies that are placed underneath the hipbone of the vehicle occupant, and outer region spring bodies that are placed on the outer sides of the inner region spring bodies in the transverse direction of the seat. Moreover, if a cross-section of the seat extending in the fore-and-aft direction is viewed, then at least the inner region spring body portion that is located on the front side of the bottommost end portion of the hipbone of the vehicle occupant is seen to be positioned lower than the outer region spring bodies.

14 Claims, 4 Drawing Sheets

(56) References Cited

U.S. PATENT DOCUMENTS

| | | | |
|---|---|---|---|
| 4,606,532 A * | 8/1986 | Kazaoka et al. | 267/102 |
| 4,682,763 A * | 7/1987 | Kazaoka et al. | 267/89 |
| 4,969,687 A * | 11/1990 | Higuchi et al. | 297/452.18 |
| 5,067,772 A * | 11/1991 | Koa | 297/452.55 |
| 2002/0003366 A1* | 1/2002 | Fourrey et al. | 297/284.1 |
| 2002/0043870 A1* | 4/2002 | Kuster et al. | 297/452.52 |
| 2002/0117885 A1* | 8/2002 | Barile et al. | 297/452.52 |
| 2004/0160113 A1* | 8/2004 | Rehfuss et al. | 297/452.52 |
| 2005/0231010 A1* | 10/2005 | Nagayama | 297/216.1 |
| 2007/0028702 A1* | 2/2007 | Sakamoto et al. | 73/862.621 |
| 2009/0152931 A1* | 6/2009 | Sahashi | 297/452.49 |

FOREIGN PATENT DOCUMENTS

| | | |
|---|---|---|
| JP | 63-124842 | 8/1988 |
| JP | 2006-192008 | 7/2006 |
| JP | 2006-280432 | 10/2006 |

\* cited by examiner

VEHICLE SEAT CUSHION

TECHNICAL FIELD

This invention relates to a seat cushion for a vehicle seat that supports the buttocks and thighs of a vehicle occupant.

Priority is claimed on Japanese Patent Application No. 2010-287716, filed Dec. 24, 2010, the contents of which are incorporated herein by reference.

TECHNICAL BACKGROUND

A majority of the portions of vehicle seats that are in contact with the body of a seated vehicle occupant are formed by cushion bodies, and these cushion bodies are supported on a seat frame via a plurality of spring bodies such as S-shaped springs or the like (see, for example, Patent document 1).

Moreover, a seat cushion of this type has been proposed in which spring bodies that are suspended from a cushion frame are placed such that they avoid a position directly below the bottommost end portion of the hipbone (i.e., the ischial tuberosity) of the seated vehicle occupant, so that a situation in which the load is concentrated in one portion of the buttocks of the vehicle occupant can be avoided (see, for example, Patent document 2).

DOCUMENTS OF THE PRIOR ART

Patent Documents

[Patent document 1] Japanese Unexamined Patent Application, First Publication No. 2006-280432
[Patent document 2] Japanese Unexamined Patent Application, First Publication No. 2006-192008

DISCLOSURE OF THE INVENTION

Problems to be Solved by the Invention

In this conventional seat cushion, because the spring bodies are placed away from the bottommost end portion of the hipbone (i.e., the ischial tuberosity) of the seated vehicle occupant, any sense of discomfort or feeling of pressure by the vehicle occupant can be decreased. However, there is a concern that the vehicle occupant will not be able to correct their sitting posture and that when the vehicle occupant is seated for a prolonged period, a poor sitting posture will cause the vehicle occupant to become fatigued.

For this reason, it is an object of this invention to provide a seat cushion for a vehicle seat that makes it possible for a vehicle occupant to correct their sitting posture and thereby alleviate their sitting fatigue.

Means for Solving the Problem

The present invention employs the following means in order to solve the above-described problems and achieve the desired objective.
(1) Namely, a vehicle seat cushion according to an aspect of the present invention is provided with: a cushion body that makes contact with the body of a vehicle occupant; and a plurality of spring bodies that are suspended on a seat frame so as to extend in the fore-and-aft direction of the seat, the cushion body being mounted on a top surface of the plurality of spring bodies. The plurality of spring bodies extend in the fore-and-aft direction and are formed by the inner region spring bodies that are placed underneath the hipbone of the vehicle occupant, and outer region spring bodies that are placed on the outer sides of the inner region spring bodies in the transverse direction of the seat 1. Moreover, if a cross-section of the seat extending in the fore-and-aft direction is viewed, then at least the inner region spring body portion that is located on the front side of the bottommost end portion of the hipbone of the vehicle occupant is seen to be positioned lower than the outer region spring bodies.
(2) In the vehicle seat cushion according to the above-described (1), a recessed portion may be provided in a rear surface side of the cushion body on the forward side of the bottommost end portion of the hipbone of the vehicle occupant.
(3) In the vehicle seat cushion according to the above-described (1) or (2), the plurality of spring bodies may be formed by wire-shaped spring components, and for an outer diameter of the at least one inner region spring body to be smaller than an outer diameter of the at least two outer region spring bodies.

Effects of the Invention

According to the vehicle seat cushion described above in (1), when a vehicle occupant sits down on a cushion body, the bottommost portion of the hipbone of the vehicle occupant is positioned above the inner region spring bodies. At this time, in the portion of the inner region spring bodies that is located in front of the bottommost end portion of the hipbone of the vehicle occupant, if a cross-section of the seat extending in the fore-and-aft direction thereof is viewed, then the height of the inner region spring bodies that are located in front of the bottommost end portion of the hipbone of the vehicle occupant is lower than the height of the outer region spring bodies. As a consequence, when both of the buttocks and the thigh portions are being supported by the outer region spring bodies, the hipbone of the vehicle occupant tends to lean towards the front centering on the bottommost portion of this hipbone. Accordingly, the lumbar vertebrae of the vehicle occupant arch towards the front, and the waist portion of the vehicle occupant is corrected so as to describe a natural S-shaped curve.

Moreover, when the vehicle occupant is sitting on the cushion body, then when both of the buttocks and the thigh portions of the vehicle occupant are being supported by the outer region spring bodies, the hipbone tends to tilt forward centering on the bottommost portion thereof. As a result of this, the sitting posture of the vehicle occupant can be modified such that their waist portion describes a natural S-shaped curve, and it becomes possible to reliably alleviate sitting fatigue in the vehicle occupant.

According to the vehicle seat cushion described above in (2), when the vehicle occupant is sitting on the cushion body, it is easier for the front side of the bottommost portion of the hipbone of the vehicle occupant to sink down because of the recessed portion in the cushion body, so that it becomes even easier for the hipbone of the vehicle occupant to lean forwards centering on the bottommost end portion thereof.

Moreover, because it is easier for the hipbone of the vehicle occupant to lean forwards because of the recessed portion provided in the rear surface of the cushion body, it becomes possible to more reliably correct the sitting posture of the vehicle occupant.

According to the vehicle seat cushion described above in (3), the reaction force of the inner region spring bodies is weakened, and it is difficult for the load to become concentrated in the portion directly underneath the hipbone of the vehicle occupant.

Moreover, because the outer diameter of the inner region spring bodies is set smaller than the outer diameter of the outer region spring bodies, it becomes even easier for the hipbone of the vehicle occupant to be made to lean forwards. Furthermore, when the hipbone of the vehicle occupant is supported by the inner region spring bodies, it is difficult for the vehicle occupant to feel any pressure or discomfort from the inner region spring bodies. Accordingly, the sitting comfort of the vehicle occupant is improved.

DESCRIPTION OF EMBODIMENTS

Hereinafter, an embodiment of the present invention will be described based on the drawings.

Figure 1:
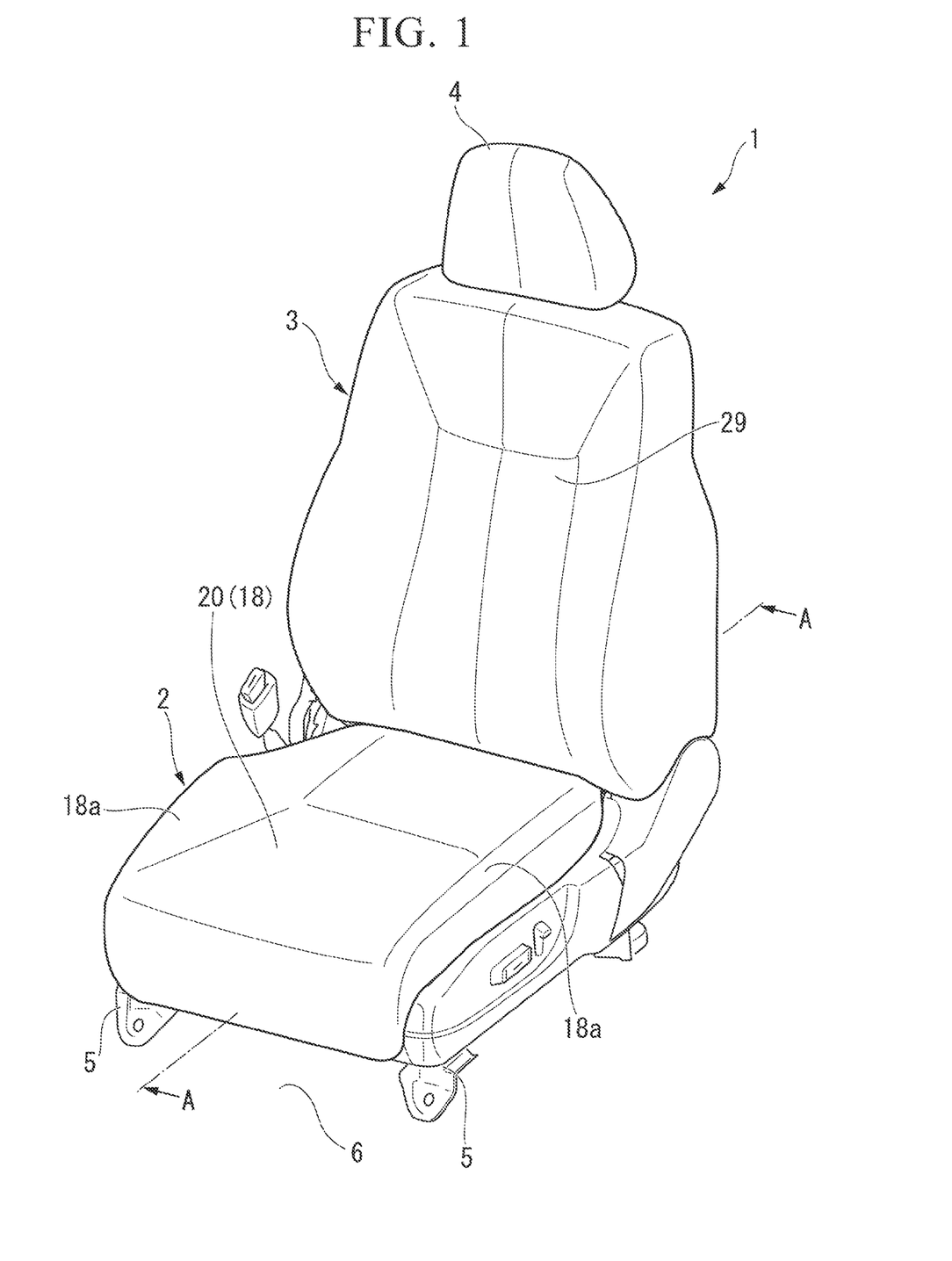
FIG. 1 is a perspective view of a vehicle seat according to an embodiment of the present invention.
Figure 2:
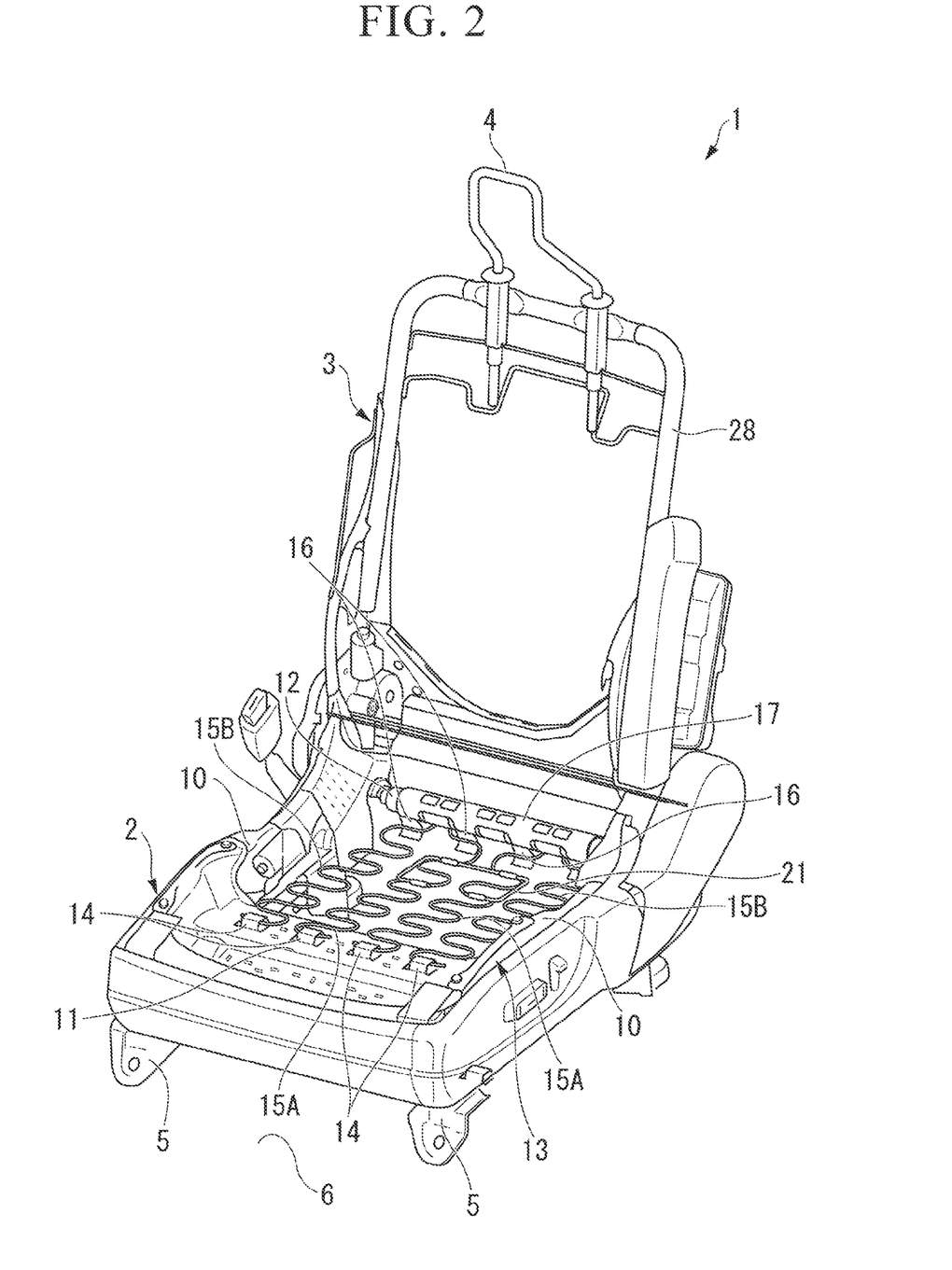
FIG. 2 is a perspective view of framework portions of a vehicle seat according to an embodiment of the present invention.

FIG. 1 is a view showing the overall structure of a seat 1 (i.e., a vehicle seat) on the front seat side of a vehicle. FIG. 2 is a view showing the entire framework portions of the seat 1.

The seat 1 includes a seat cushion 2 that supports the buttocks of a vehicle occupant (seat occupant), a seat back 3 that is pivotably joined to a rear end portion of this seat cushion 2 and supports the waist and chest portions (i.e., the back portion) of the vehicle occupant, and a head rest 4 that is supported on a top portion of this seat back 3 and supports the head and neck portions of the seat occupant.

The seat cushion 2 includes a cushion body 18 that is in contact with the body of the seat occupant, and with a plurality of spring bodies 15A and 15B that are suspended from the seat frame 13 so as to extend in the fore-and-aft direction of the seat 1 and the cushion body 18 is mounted on a top surface of the plurality of spring bodies. The plurality of spring bodies 15A and 15B extend in the fore-and-aft direction and are formed by the inner region spring bodies 15A that are placed underneath the hipbone of the seat occupant (i.e., on a seat rail 5 side), and the outer region spring bodies 15B that are placed on the outer sides of the two inner region spring bodies in the transverse direction of the seat 1. If a cross-section extending in the fore-and-aft direction of the seat 1 is viewed, then at least the inner region spring body 15A portion that is located on the front side of the bottommost end portion of the hipbone of the seat occupant is positioned lower than the outer region spring bodies 15B (i.e., on the seat rail 5 side thereof). The specific structure is described below.

Figure 3:
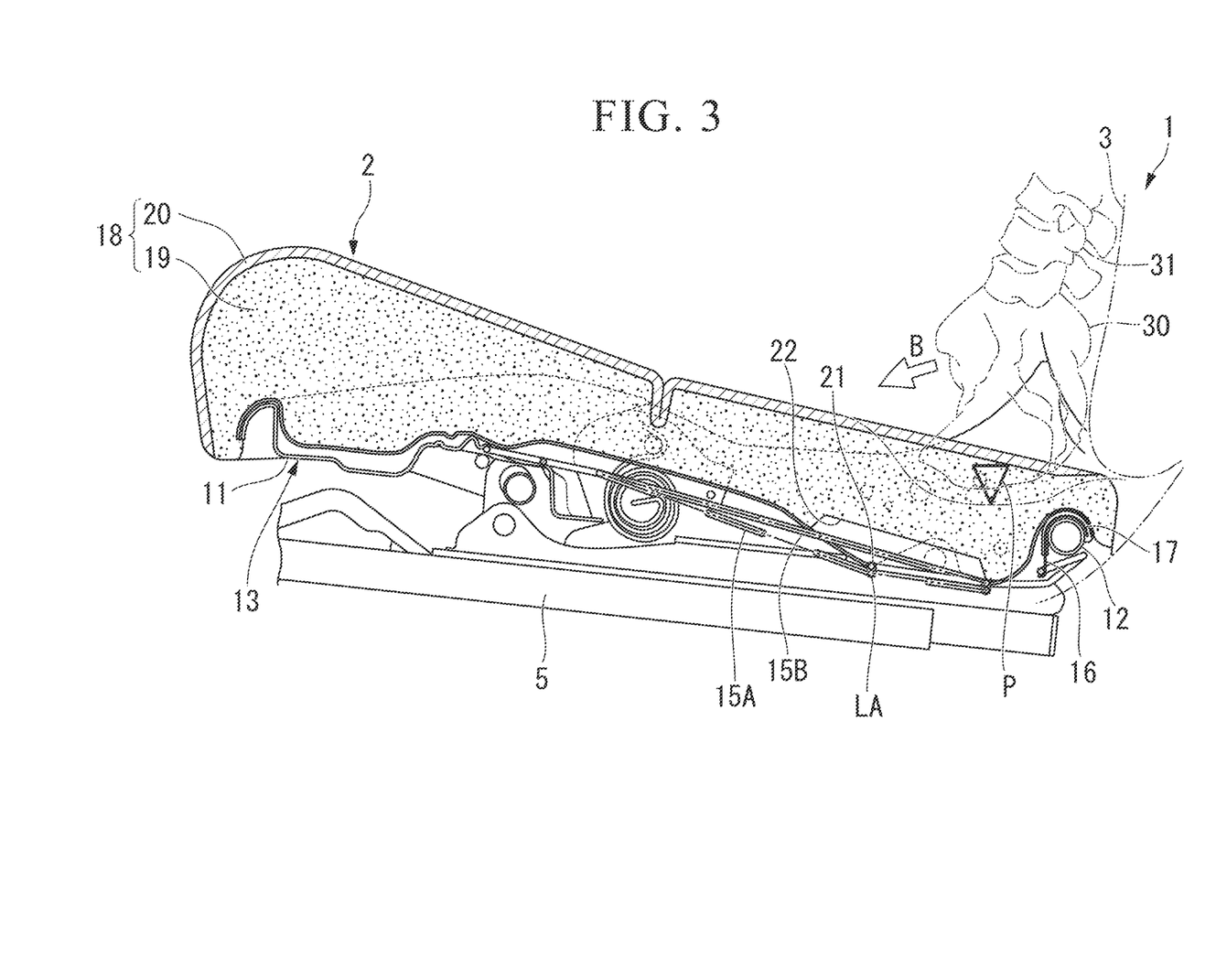
FIG. 3 is a cross-sectional view taken along a line A-A in FIG. 1 of a vehicle seat according to an embodiment of the present invention.
Figure 4:
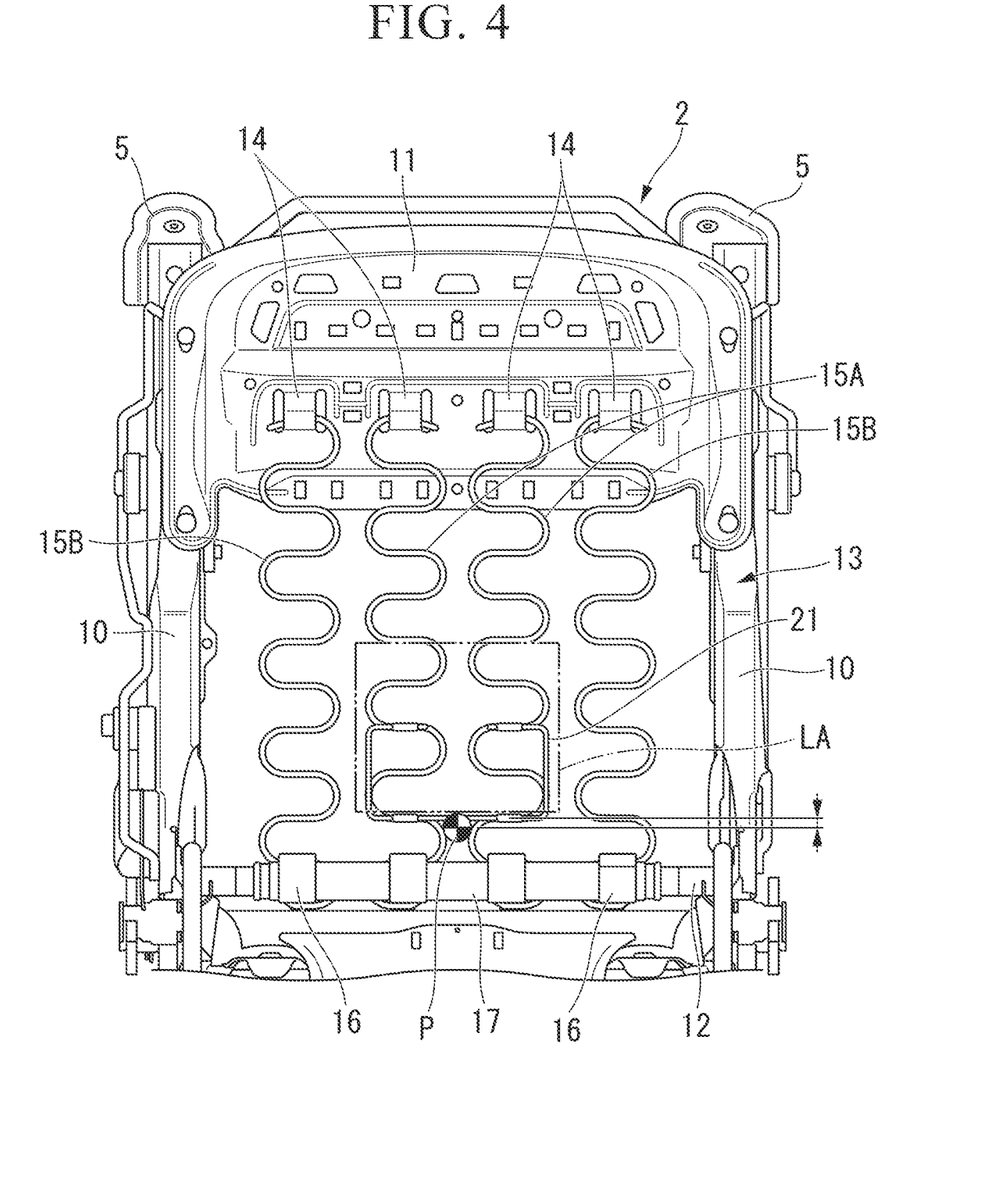
FIG. 4 is a plan view of framework portions of a seat cushion for a vehicle seat according to an embodiment of the present invention.

FIG. 3 is a vertical cross-sectional view of the seat cushion 2. FIG. 4 is a plan view of framework portions of the seat cushion 2.

As is shown in these drawings, the seat cushion 2 is provided with a pair of side members 10 and 10 that extend in the fore-and-aft direction of the vehicle body, a front portion supporting plate 11 that is located on the forward side, and a cross member 12 that is located on the rearward side. A substantially rectangular seat frame 13 is formed by joining the pair of side members 10 and 10 to the front portion supporting plate 11 on the forward side, and the cross member 12 on the rearward side.

Four spring supporting portions 14 . . . that are arranged equidistantly in the transverse direction of the seat 1 are provided on a rear edge portion of the front portion supporting plate 11. Front end portions of the S-shaped springs (spring bodies) 15A and 15B (described below) are anchored to the respective supporting portions 14. Moreover, a bracket 17 that has four spring supporting pieces 16 . . . that are arranged equidistantly in the transverse direction of the seat 1 is fixed to the cross member 12. Rear end portions of the S-shaped springs 15A and 15B are anchored to the respective spring supporting pieces 16 of the bracket 17. The four S-shaped springs 15A and 15B are arranged in the transverse direction (i.e., in the left-right direction) of the seat 1, and zigzag to as to form S shapes, and are also formed from linear steel. Moreover, the front and rear end portions of the four S-shaped springs 15A and 15B are anchored to the spring supporting portions 14 of the supporting plate 11 and to the spring supporting pieces 16 of the bracket 17. As a result, the four S-shaped springs 15A and 15B are suspended from the seat frame 13 so as to extend in the fore-and-aft direction of the seat 1. The seat frame 13 is mounted on a vehicle body floor 6 via the seat rails 5 such that it is able to slide in the fore-and-aft direction.

Moreover, the cushion body 18 that is in contact with the body of a seated seat occupant is placed on top of the seat frame 13 and the S-shaped springs 15A and 15B that are suspended from the seat frame 13.

As is shown in FIG. 3, the principal components of the cushion body 18 are a padding material 19 that is formed from a foam resin such as urethane foam or the like, and a covering material 20 that is formed from a woven fabric or leather or the like. Side supports 18a (see FIG. 1) that bulge upwards and extend in the seat fore-and-aft direction are provided on both side portions in the transverse direction of the seat 1.

As is shown in FIG. 2, a supporting mat (not shown) is attached via wires to a substantially rectangular seat frame 28 of the seat back 3, and a cushion body 29 (see FIG. 1) is supported by means of the seat frame 28 and this supporting mat. Although the detailed description will be omitted, this cushion body 29 is formed by a padding material and a covering material as its principal components in the same way as the cushion body on the seat cushion 2 side.

Of the S-shaped springs 15A and 15B that are suspended from the seat frame 13 on the seat cushion 2 side, two S-shaped springs 15A (hereinafter, these are referred to as the inner side S-shaped springs) are provided in a center portion in the transverse direction of the seat 1 where the hip bone 30 of a seated seat occupant is positioned. One each of the S-shaped springs 15B (hereinafter, these are referred to as the outer side S-shaped springs) is positioned on the outer sides (i.e., on the side member 10 sides) in the transverse direction of the seat 1 of the inner side S-shaped springs 15A and 15A. Namely, the S-shaped springs 15B are positioned such that they sandwich the S-shaped springs 15A in the transverse direction of the seat 1.

As is shown in FIG. 3, the outer side S-shaped springs 15B extend such that, when seen in a side view, they connect the spring supporting pieces 16 of the rearward side bracket 17 to the supporting plate 11 on the forward side in substantially a straight line. In contrast to this, a portion in the fore-and-aft direction of the seat 1 of the two inner side S-shaped springs 15A is located lower down (i.e., on the seat rail 5 side) than the outer side S-shaped springs 15.

Specifically, an area LA that is depressed downwards (hereinafter, referred to as a depressed area) is provided in a portion of the inner side S-shaped springs 15A that is positioned directly in front of (i.e., on the forward side of) a bottommost end portion P of the hipbone 30 (i.e., the ischial tuberosity) of the seat occupant when the seat occupant sits down properly so as to press their waist portion back against the seat back 3. This depressed area LA is set so that its height over its entire area is lower than the outer side S-shaped springs 15B at the same seat position in the fore-and-aft direction.

Moreover, in the case of this embodiment, the wire diameter (i.e., the outer diameter) of the inner side S-shaped springs 15A is preferably set smaller than the wire diameter (i.e., the outer diameter) of the outer side S-shaped springs 15B. Moreover, as is shown in FIG. 3 and FIG. 4, the seat cushion 2 is preferably provided with a reinforcing wire 21 that prevents any deformation that might exceed the elastic limit being generated as a result of the load being concentrated in the inner side S-shaped springs 15A.

Moreover, a recessed portion 22 is preferably provided in a portion of the rear surface (i.e., the downward facing surface) of the padding material 19 of the cushion body 18 that faces the depressed area LA of the inner side S-shaped springs 15A. This recessed portion 22 is provided at the position directly in front of the bottommost end portion P (i.e., the ischial tuberosity) of the hipbone 30 of the fully seated seat occupant.

In the above described structure, when the seat occupant sits back properly in the seat 1 so that their waist portion is pressed back against the seat back 3, the bottommost end portion P of the hip bone 30 of the seat occupant is positioned slightly towards the rear of the depressed area LA above the inner side S-shaped springs 15A. At this time, the portion of the inner side S-shaped springs 15A that is directly in front of the bottommost end portion P of the hip bone 30 of the seat occupant is lower than the height of the two outer side S-shaped springs 15B. As a result, when both of the buttocks and the thigh portions of the seat occupant are being supported by the outer side S-shaped springs 15B, the hipbone 30 of the seat occupant tends to lean towards the front, as is shown by the arrow B in FIG. 3, with the bottommost portion P acting as a fulcrum. Namely, the reaction force received from the seat cushion 2 by the front surface side of the bottommost end portion P of the hipbone 30 of the seat occupant is small at this time. Accordingly, when, as a result of the seat occupant sitting back properly in their seat, the reaction force from the seat back 3 side acts against the back surface of their waist portion, and this force acts as a force to push the hipbone 30 towards the front using the bottommost end portion P as a fulcrum. Moreover, in the case of this embodiment, the fact that the recessed portion 22 is formed in the rear surface of the cushion body 18 (i.e., the padding material 19) also works as an interaction, so that the reaction force received from the seat cushion 2 by the front surface side of the bottommost end portion P of the hipbone 30 of the seat occupant is even smaller.

Accordingly, when the seat occupant sits back properly in the seat 1, the hipbone 30 of the seat occupant leans towards the front with the bottommost end portion P acting as a fulcrum so that the lumbar vertebrae 31 of the seat occupant arch towards the front, and the waist portion of the seat occupant describes a natural S-shaped curve.

As is described above, in the seat cushion 2 of this seat 1, when the seat occupant is sitting back properly on top of the cushion body 18, then when both of the buttocks and the thigh portions of the seat occupant are being supported by the outer side S-shaped springs 15B, the hipbone tends to lean forward towards the depressed area LA of the inner side S-shaped springs 15A with the bottommost portion P acting as a fulcrum. As a result of this, the sitting posture of the seat occupant can be modified such that their waist portion describes a natural S-shaped curve, and it becomes possible to reliably alleviate sitting fatigue in the seat occupant.

Moreover, in this seat cushion 2, the recessed portion 22 is further provided in an area that faces the depressed area LA in the rear surface of the cushion body 18. Consequently, because the inner side S-shaped springs 15A are more easily bent than the outer side S-shaped springs 15B, when the seat occupant is sitting back properly, the hip bone 30 of the seat occupant is able to lean forward more easily using the bottommost end portion P thereof as a fulcrum. Accordingly, this is more effective towards correcting the sitting posture of the seat occupant.

Furthermore, in the case of the seat cushion 2 of this embodiment, the wire diameter (i.e., the outer diameter) of the inner side S-shaped springs is set smaller than the wire diameter (i.e., the outer diameter) of the outer side S-shaped springs. As a result of this, the hipbone 30 of the seat occupant is able to lean more easily forward using the bottommost end portion P thereof as a fulcrum. Furthermore, when the hipbone 30 of the seat occupant is being supported by the inner side S-shaped springs 15A, it is difficult for the seat occupant to feel any pressure or discomfort from the inner side S-shaped springs 15A. Accordingly, the comfortableness of the seat cushion 2 is improved.

Note that this invention is not limited to the above-described embodiments, and various design modifications are possible insofar as they do not depart from the spirit or scope of this invention.

For example, in the above-described embodiment, a structure is described in which the seat cushion 2 is provided with two inner side S-shaped springs 15A and two outer side S-shaped springs 15B, however, the number of springs is not limited to this. Namely, for example, a structure in which the seat cushion 2 is provided with at least one inner side S spring 15A and two outer side S-shaped springs 15B placed one on either side of the inner side S spring 15A, or a structure in which the seat cushion 2 is provided with three or more inner side S-shaped springs 15A and three or more outer side S-shaped springs 15B may also be employed.

DESCRIPTION OF THE REFERENCE NUMERALS

1 . . . Seat (Vehicle seat)
2 . . . Seat cushion
13 . . . Seat frame
15A . . . Inner region spring bodies
15B . . . Outer region spring bodies
18 . . . Cushion body
22 . . . Recessed portion
30 . . . Hipbone
P . . . Bottommost end portion

What is claimed is:

1. A vehicle seat cushion for a vehicle seat, comprising:
a cushion body adapted to make contact with a body of a vehicle occupant; and
a plurality of spring bodies that are suspended on a seat frame so as to extend in a fore-and-aft direction of the vehicle seat, the cushion body being mounted on a top surface of the plurality of spring bodies,
wherein the plurality of spring bodies extend in the fore-and-aft direction and is formed by inner region spring bodies that are adapted to be placed underneath a hipbone of the vehicle occupant when the vehicle occupant sits properly in the vehicle seat, and outer region spring bodies that are placed on outer sides of the inner region spring bodies in a transverse direction of the vehicle seat, wherein, the inner region spring bodies include a depressed portion and a non-depressed portion, said depressed portion being positioned lower than the outer region spring bodies when a cross-section of the vehicle seat extending in the fore-and-aft direction is viewed, the depressed portion located on a forward side in the fore-and-aft direction of a portion of the inner region spring bodies adapted to receive a bottommost end portion of the hipbone of the vehicle occupant when the vehicle occupant sits properly in the vehicle seat, and the non-depressed portion being positioned at a same height as the outer region spring bodies when the cross-section of the vehicle seat extending in the fore-and-aft direction is viewed, and wherein a recessed portion is provided in a surface side of the cushion body that faces the plurality of spring bodies, the recessed portion disposed on the forward side of both the portion of the inner region spring bodies and a portion of the cushion body that are adapted to receive the bottommost end portion of the hipbone of the vehicle occupant when the vehicle occupant sits properly in the vehicle seat so as to separate the inner region spring bodies from said surface side of the cushion body, and, among the depressed portion and the non-depressed portion, in the fore-and-aft direction the recessed portion is provided directly above and facing only the depressed portion so that the depressed portion is spaced from said surface side of the cushion body with the recessed portion interposed therebetween.

2. The vehicle seat cushion according to claim 1, wherein the plurality of spring bodies are formed by wire-shaped spring components, and an outer diameter of the inner region spring bodies is smaller than an outer diameter of the outer region spring bodies.

3. The vehicle seat cushion according to claim 2, wherein a top surface of the recessed portion is higher than the outer region spring bodies.

4. The vehicle seat cushion according to claim 1, wherein a top surface of the recessed portion is higher than the outer region spring bodies.

5. The vehicle seat cushion according to claim 1, wherein the vehicle occupant sits properly in the vehicle seat when a waist portion of the vehicle occupant is pressed back against a seat back of the vehicle seat.

6. The vehicle seat cushion according to claim 1, wherein the non-depressed portion is at least partially located on the forward side in the fore-and-aft direction of the depressed portion.

7. A vehicle seat cushion for a vehicle seat, comprising:
a cushion body adapted to make contact with a body of a vehicle occupant; and
a plurality of spring bodies that are suspended on a seat frame so as to extend in a fore-and-aft direction of the vehicle seat, the cushion body being mounted on a top surface of the plurality of spring bodies,
wherein the plurality of spring bodies extend in the fore-and-aft direction and is formed by inner region spring bodies that are adapted to be placed underneath a hipbone of the vehicle occupant when the vehicle occupant sits properly in the vehicle seat, and outer region spring bodies that are placed on outer sides of the inner region spring bodies in a transverse direction of the vehicle seat, wherein, the inner region spring bodies include a depressed portion and a non-depressed portion, said depressed portion being positioned lower than the outer region spring bodies when a cross-section of the vehicle seat extending in the fore-and-aft direction is viewed, the depressed portion located on a forward side in the fore-and-aft direction of a portion of the inner region spring bodies adapted to receive a bottommost end portion of the hipbone of the vehicle occupant when the vehicle occupant sits properly in the vehicle seat, and the non-depressed portion being positioned at a same height as the outer region spring bodies when the cross-section of the vehicle seat extending in the fore-and-aft direction is viewed, the non-depressed portion is at least partially located on the forward side in the fore-and-aft direction of the depressed portion and wherein a recessed portion is provided in a rear surface side of the cushion body on the forward side of the portion of both the inner region spring bodies and a portion of the cushion body that are adapted to receive the bottommost end portion of the hipbone of the vehicle occupant when the vehicle occupant sits properly in the vehicle seat so as to separate the inner region spring bodies from the rear surface side of the cushion body.

8. The vehicle seat cushion according to claim 7, wherein the vehicle occupant sits properly in the vehicle seat when a waist portion of the vehicle occupant is pressed back against a seat back of the vehicle seat.

9. A vehicle seat cushion for a vehicle seat comprising:
a cushion body configured to contact with a body of a vehicle occupant; and
a plurality of spring bodies that are suspended on a seat frame so as to extend in a fore-and-aft direction of the vehicle seat, the cushion body being mounted on a top surface of the plurality of spring bodies,
wherein the plurality of spring bodies extend in the fore-and-aft direction and are formed by inner region spring bodies, and outer region spring bodies that are placed on outer sides of the inner region spring bodies in a transverse direction of the vehicle seat,
wherein, the inner region spring bodies include a depressed area which is positioned lower than the outer region spring bodies;
wherein when the vehicle occupant sits properly on top of the cushion body and when a cross-section of the seat extending in the fore-and-aft direction is viewed, at least the depressed area of the inner region spring bodies is located on a forward side of a bottommost end portion of a hipbone of the vehicle occupant such that both of buttocks and thigh portions of the vehicle occupant are supported by the outer region spring bodies and the hipbone of the vehicle occupant tends to lean towards front with the bottommost end portion of the hipbone of the vehicle occupant as a fulcrum; and
wherein a recessed portion is provided in a rear surface side of the cushion body and is configured to face the depressed area of the inner region spring, when the vehicle occupant sits properly on top of the cushion body and when the cross-section of the seat extending in the fore-and-aft direction is viewed, the recessed portion is located on the forward side of the bottommost end portion of the hipbone of the vehicle occupant so as to separate the inner region spring bodies from the rear surface side of the cushion body.

10. The vehicle seat cushion according to claim 9, wherein the plurality of spring bodies are formed by wire-shaped components, and an outer diameter of the inner region spring bodies is smaller than an outer diameter of the outer region spring bodies.

11. The vehicle seat cushion according to claim 10, wherein a top surface of the recessed portion is higher than the outer region spring bodies.

12. The vehicle seat cushion according to claim 9, wherein a top surface of the recessed portion is higher than the outer region spring bodies.

13. The vehicle seat cushion according to claim 9, wherein the vehicle occupant sits properly in the vehicle seat when a waist portion of the vehicle occupant is pressed back against a seat back of the vehicle seat.

14. The vehicle seat cushion according to claim 9, wherein a non-depressed portion is at least partially located on the forward side in the fore-and-aft direction of the depressed area.

\* \* \* \* \*